United States Patent
Bloemen et al.

(10) Patent No.: US 7,431,486 B2
(45) Date of Patent: Oct. 7, 2008

(54) LED ASSEMBLY FOR REAR LAMPS IN AN AUTOMOBILE

(75) Inventors: Pascal J. H. Bloemen, Eindhoven (NL); Willem H. Smits, Veldhoven (NL); Nicola B. Pfeffer, Eindhoven (NL); Wiep Folkerts, Eindhoven (NL)

(73) Assignee: Philips Lumileds Lighting Company, LLC, San Jose, CA (US)

( * ) Notice: Subject to any disclaimer, the term of this patent is extended or adjusted under 35 U.S.C. 154(b) by 77 days.

(21) Appl. No.: 11/466,420

(22) Filed: Aug. 22, 2006

(65) Prior Publication Data

US 2008/0049438 A1 Feb. 28, 2008

(51) Int. Cl.
*B60Q 1/26* (2006.01)

(52) U.S. Cl. .................. 362/540; 362/545; 362/184; 362/297

(58) Field of Classification Search ......... 362/540–543, 362/545, 547, 299, 302, 304
See application file for complete search history.

(56) References Cited

U.S. PATENT DOCUMENTS

| | | | | |
|---|---|---|---|---|
| 4,812,808 A | * | 3/1989 | Ulrich | 340/468 |
| 5,592,146 A | * | 1/1997 | Kover, Jr. | 340/468 |
| 6,773,154 B2 | * | 8/2004 | Desai | 362/541 |
| 6,814,470 B2 | * | 11/2004 | Rizkin et al. | 362/327 |
| 7,048,412 B2 | * | 5/2006 | Martin et al. | 362/247 |
| 7,111,969 B2 | * | 9/2006 | Bottesch et al. | 362/517 |
| 7,156,544 B2 | * | 1/2007 | Ishida | 362/538 |
| 7,207,695 B2 | * | 4/2007 | Coushaine et al. | 362/240 |

* cited by examiner

*Primary Examiner*—Ali Alavi
(74) *Attorney, Agent, or Firm*—Patent Law Group LLP; Brian D. Ogonowsky

(57) ABSTRACT

Various techniques are described herein for combining two or more LEDs in a single reflective cavity for a rear lamp in an automobile. The LEDs may be two or more different colors for performing different functions, such as a stop light, a turn signal, and a tail light. In one embodiment, the LEDs have side emitting lenses and are coaxially aligned in a parabolic reflector. The LEDs may be mounted facing each other or mounted in the same direction, or a combination of both. The LEDs may share a common heat sink. A second reflector may be positioned inside a larger reflector, where a first LED is mounted near the focal point of the larger reflector, and a second LED is mounted near the focal point of the inner reflector. Additional LEDs may also be mounted in either reflector and separately controlled.

25 Claims, 3 Drawing Sheets

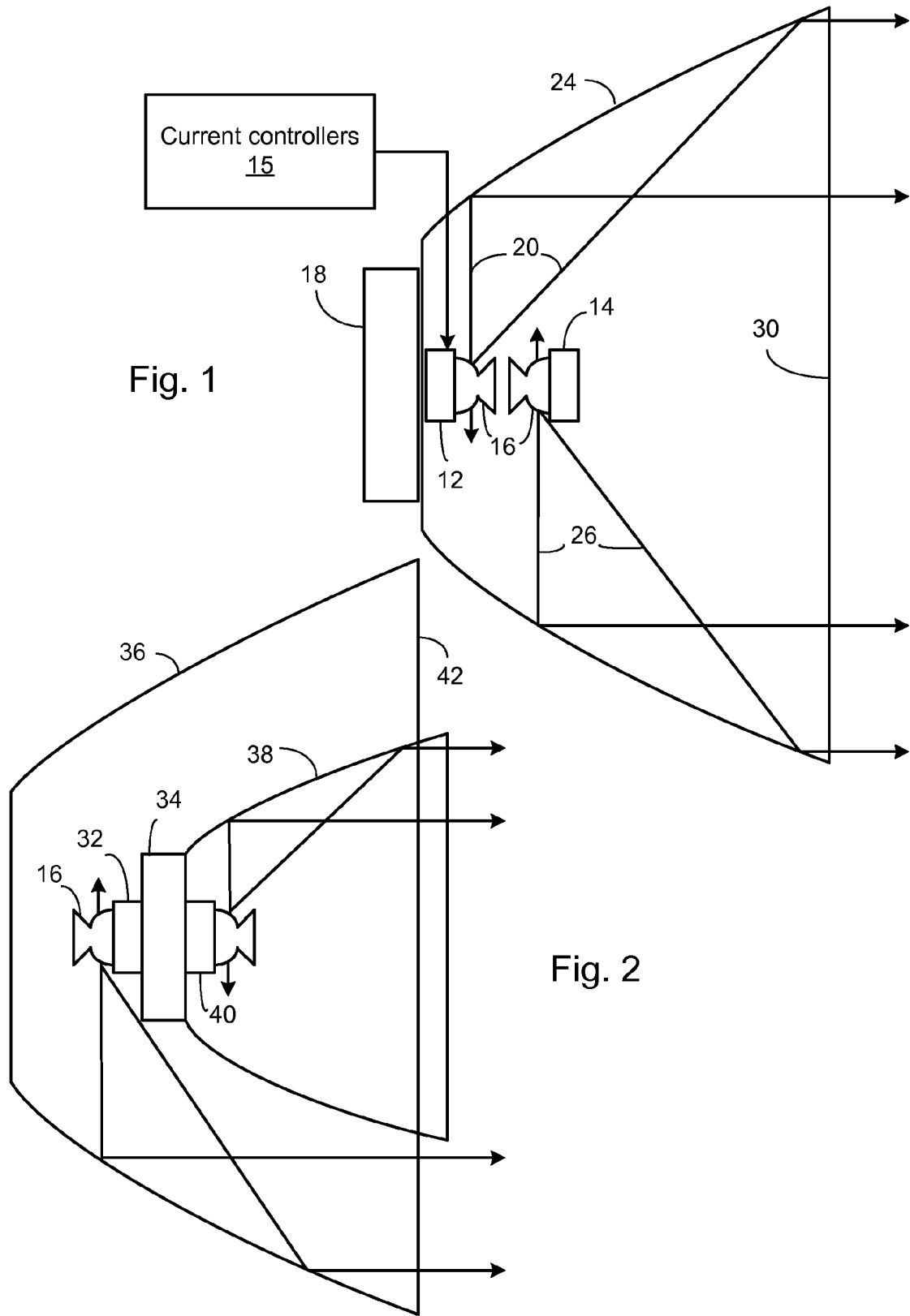

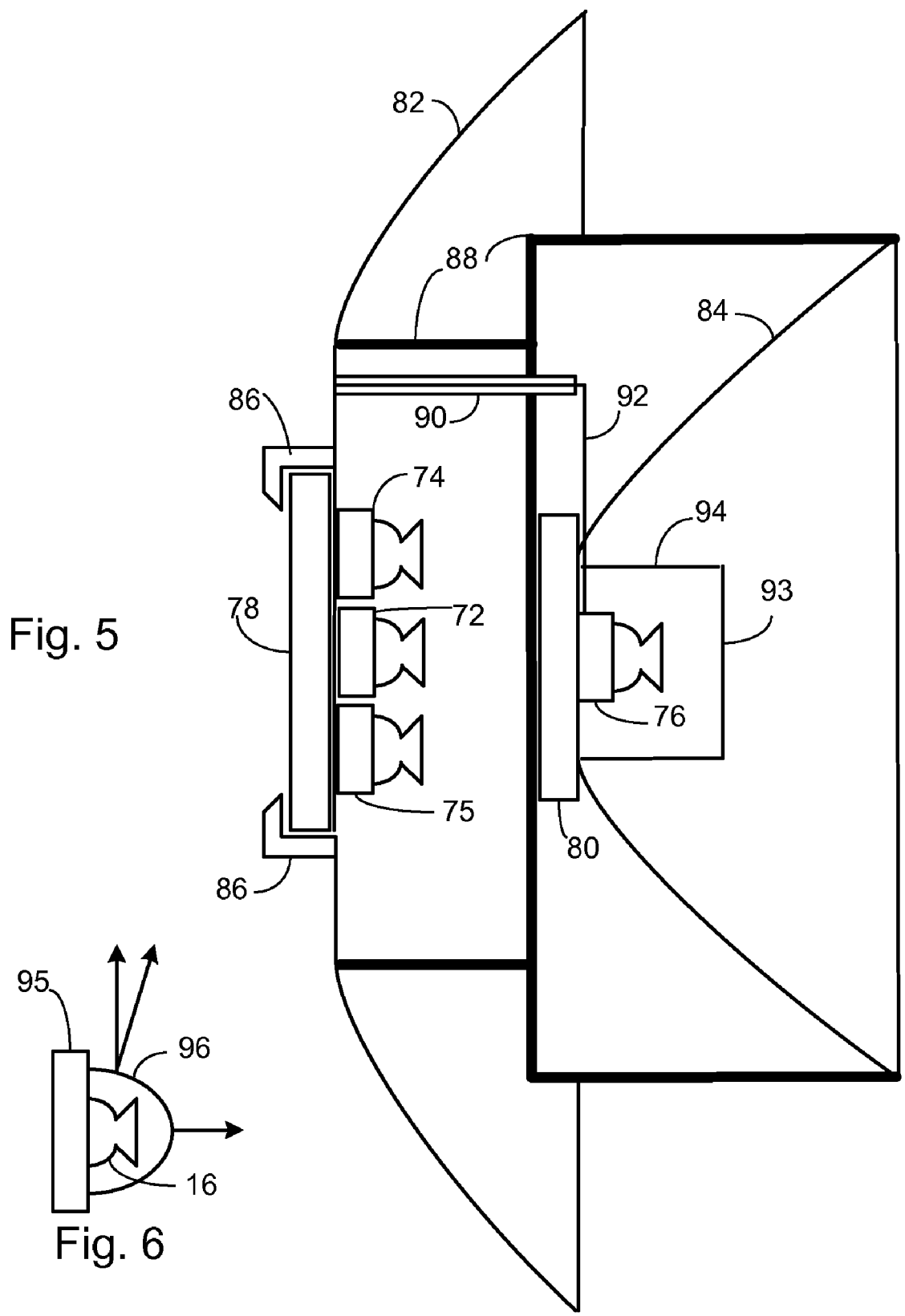

LED ASSEMBLY FOR REAR LAMPS IN AN AUTOMOBILE

FIELD OF INVENTION

This invention relates to using light emitting diodes (LEDs) in rear lamps of an automobile and, in particular, to techniques for using two or more separately controllable LEDs in a common reflector for different functions, such as a stop light, a tail light, and a turn signal.

BACKGROUND

A typical automobile has a rear lamp assembly at both ends of the rear of the automobile. Each assembly typically has at least three light sources, such as incandescent light bulbs, mounted in multiple reflective housings. A first bulb acts as a tail light and is illuminated when the front headlights or running lights are illuminated. The tail light indicates the boundaries of the automobile at night. A second bulb acts as a stop light and is illuminated when the driver steps on the brake pedal. A third bulb is a turn signal that is intermittently illuminated when the driver actuates the turn signal. Typically, the light bulbs emit white light, and a colored diffusive filter is fitted over the reflector to create red, orange, or amber light for the stop light, tail light, and turn signal.

It is known to replace incandescent light bulbs with LEDs for longer life and faster turn-on.

Typically, there are multiple reflectors in the rear lamp assembly, one for each light source, since each light source is located at or near the focal point of the reflector to achieve the desired light emission pattern. The multiple reflectors and separation of the light sources results in a relatively large and expensive rear light assembly.

It is desirable to reduce the size and cost of rear lamp assemblies for automobiles. The small dimensions of the LEDs help to meet these desires.

SUMMARY

Various techniques are described herein for combining two or more separately controllable LEDs in a single reflective cavity for use as a rear lamp assembly in an automobile. The LEDs may be two or more different colors for performing different functions, such as a stop light, a turn signal, and a tail light.

In one embodiment, each LED has a side-emitting lens so almost all light is emitted from the sides of the LED package. By using side-emitting LEDs, the light emission pattern is a product of the reflector since almost all light is reflected off the walls of the reflector. Therefore, the light directions can be controlled to a higher degree, enabling one to more efficiently generate the required emission pattern.

In one embodiment, two LEDs are coaxially mounted along a common center line of a single reflector and are facing one another. The side-emitting lenses of both LEDs are at approximately the focal point of the common reflector. Therefore, the light from each LED will produce a similar emission profile across the outer lens of the reflector. The brightness of each LED and the color of each LED are selected to be appropriate for the particular function of each LED. In one embodiment, one of the LEDs emits a red or orange light and is used for both a stop light and a tail light. A higher current is applied to the LED when the driver steps on the brake pedal. The other LED may be amber for a turn signal.

In another embodiment, one LED is mounted near the focal point of a relatively large reflector, and a second LED is mounted near the focal point of a smaller reflector mounted in the large reflector along the center line. The LEDs may share a common heat sink.

In another embodiment, three LEDs are mounted along the center line, where two LEDs face each other, and the third LED is located in a smaller reflector positioned within the larger reflector along the center line.

In another embodiment, three LEDs are mounted on a common heat sink and are mounted within a relatively large reflector. A single LED is mounted near the focal point of a smaller reflector mounted in the large reflector along the center line. The top LED is red and is used for a tail light and stop light. The lower three LEDs consist of a red LED for a tail light and two amber LEDs for a turn signal. Doubling up on LEDs for a single function increases the light output of the lamp for that function.

Other embodiments are described.

BRIEF DESCRIPTION OF THE DRAWINGS

FIG. 1 is a cross-section of a first embodiment of a rear lamp assembly using two LEDs facing each other.

FIG. 2 is a cross-section of a second embodiment of a rear lamp assembly using two LEDs mounted back to back and sharing a common heat sink.

FIG. 5 is a cross-section of a fifth embodiment of a rear lamp assembly using four LEDs, where three LED are mounted in relatively large reflector, and a forth LED, mounted in the same direction as the three other LEDs, is mounted in a smaller reflector within the larger reflector.

FIG. 6 is a side view of an LED package with a dome lens for further affecting the light emission from the LED to optimize the light output, such as by reducing the angle of the side-emission of light.

DETAILED DESCRIPTION

Figure 3:
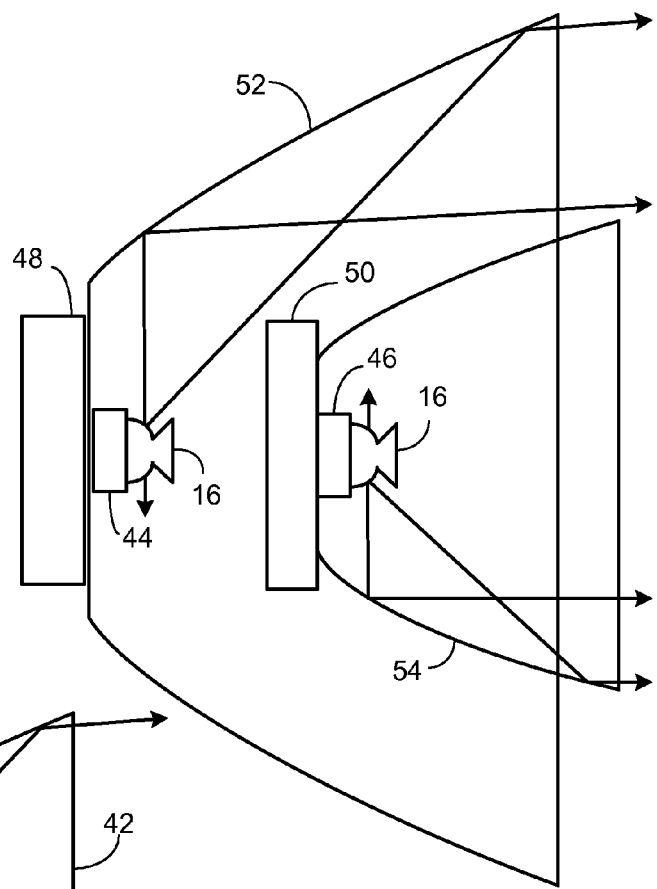
FIG. 3 is a cross-section of a third embodiment of a rear lamp assembly using two LEDs, where one LED is mounted in relatively large reflector, and another LED is mounted in a smaller reflector within the larger reflector.

FIG. 1 is a cross-sectional view of a first embodiment of a rear lamp assembly. The assembly includes two LEDs 12 and 14. Each LED 12 or 14 includes a semiconductor LED chip mounted on a submount and packaged. The package protects the LED chip and provides terminals for soldering to a small printed circuit board (PCB), also part of LED 12 or 14. The submount may be ceramic or another material. The anode and cathode metal pads on the semiconductor chip are electrically connected to metal pads on the submount. The submount is then mounted on a small PCB, where the PCB includes electrical connectors for connection to a power source, such as a current source. The PCB may include an insulated metal layer to serve as a heat sink. Suitable packaged LEDs, such as Luxeon LEDs by Philips-Lumileds Lighting, LLC, may be on the order of one centimeter across or less.

The magnitude of current through the LED determines the brightness of the LED. Current controllers 15 are shown in FIG. 1 for independently controlling the different LEDs. Drivers for LEDs are conventional and need not be described herein in detail. U.S. Pat. No. 6,836,081 to Swanson et al., co-assigned to the present assignee and incorporated herein by reference, describes drivers for LEDs that may be suitable for the present embodiments.

Forming LEDs of all visible wavelengths, mounting such LEDs on a submount, and providing power to the LEDs via a PCB are conventional and need not be shown or described in detail. U.S. Pat. No. 6,828,596 to Steigerwald et al. and U.S. Pat. No. 6,876,008 to Bhat et al., both assigned to the present assignee and incorporated herein by reference, describe LEDs, mounting the LEDs on a submount, and mounting the submount on a PCB.

The LEDs 12 and 14 have a side-emitting lens 16 placed over them to cause most of the light emitted by the semiconductor chip to be directed, by total internal reflection (TIR), out the sides of the LED. The side-emitting lens 16 may emit a majority of the light within, for example, 0-45 degrees relative to the top surface of the LED. Examples of side-emitting lenses are found in U.S. Pat. Nos. 6,598,998 and 6,679,621 to Scott West et al., assigned to the present assignee and incorporated herein by reference. The various figures illustrate sample light rays whose limited angles are a result of the side-emitting lenses 16.

LED 12 is mounted on a heat sink 18, such as a slab of metal exposed to air or a finned metal. A heat sink is important if the LED may be illuminated for long periods of time, such as a tail light. Accordingly, in FIG. 1, LED 12 is presumed to be used for a tail light, which is on when the automobile's headlights or running lights are on. A heat sink may also be attached to the back of LED 14 if necessary for removal of heat from LED 14.

The LEDs 12 and 14 are mounted in a reflector 24 so that the light output of both LEDs occurs near the focal point of the reflector 24. Light rays 20 emitted from LED 12 are reflected off the generally parabolic walls of the reflector 24. The walls may be a chrome-plated plastic or a formed metal. The LEDs are shown much larger than they really would be in a practical reflector to better illustrate the side emitting lens 16. As a tail light, the emitted light should be red or orange. Accordingly, the LED 12 chip should be formed of a material, such as a combination of group III and group V elements with phosphorous (e.g., AlInGaP) that produces light in the orange and red wavelengths.

LED 14 is mounted in reflector 24 so that the top of its lens 16 is facing the top of lens 16 of LED 12. In one embodiment, the distance between the two lenses is between 0 mm and 1 cm. This causes the light emissions of both LEDs 12 and 14 to substantially originate at the same place, close to the focal point of the reflector 24. This will cause the light exiting the reflector 24 to be generally parallel to the ground.

LED 14 (along with its PCB and heat sink) may be secured in its position within the reflector 24 by two or more thin plastic or metal arms, or a transparent plastic cylinder, connected to a base of the reflector 24.

Power supply wires (not shown) are connected to LEDs 12 and 14 for providing current from current controllers 15. The current controllers 15 provide current to each LED in the various embodiments separately for carrying out the different functions of the LEDs.

Light rays 26 are shown being emitted by LED 14 and exiting the reflector 24 at an angle generally parallel to the ground. Although the light from LED 12 and 14 is emitted in a 360 degree circle, only a few rays are shown for simplicity.

LED 14 may emit a color that is different from the color emitted by LED 12. For example, if LED 14 were a turn signal, LED 14 may emit amber light. If LED 14 were a stop light, LED 14 may emit a red or red orange light that is noticeably different from the color emitted by LED 12.

The reflector 24 may include a diffusing lens 30 that may also enhance the brightness within a limited angle, such as generally parallel to the ground. Such a lens may be untinted so as to not attenuate the light output of the LEDs.

Due to the small size of LEDs, such a configuration of two LEDs in a reflector is possible. Placing two incandescent bulbs face-to-face would place the filaments too far apart and result in the reflector not redirecting the light from both lamps in the same direction.

FIG. 2 illustrates a second embodiment of a rear lamp assembly for an automobile. A first LED 32, with a side-emitting lens 16, is mounted on a heat sink 34. The heat sink 34 is held in position by any means, such as by two or more metal or plastic legs, or a transparent cylinder, connected to the base of reflector 36. The side-emission is reflected off the walls of reflector 36, and the light is output from the rear lamp assembly in a direction generally parallel to the ground.

A second reflector 38 is positioned inside of reflector 36 and houses an LED 40 with a side-emitting lens 16. LEDs 32 and 40 share the same heat sink, attached to the base of the second reflector 38. The reflector 38 is aligned with the center line of the reflector 36. Both reflectors 36 and 38 may share the same outer lens 42, or the outer lens for each reflector may be different for a different appearance.

The reflected light from LED 32 essentially forms a circle around the reflected light from LED 40. The LEDs may be the same color or different colors. In one embodiment, LED 32 is a tail light, and LED 40 is a stop light. Any of the LEDs may be a tail light, a stop light, or a turn signal.

FIG. 3 illustrates a third embodiment of a rear lamp assembly, where the LEDs 44 and 46 are mounted on associated heat sinks 48 and 50, respectively. Heat sink 50 may be held in place by metal or plastic legs, or a transparent cylinder, connected to the base of the outer reflector 52. LED 46 is housed in an inner reflector 54. The remainder of the lamp assembly may be similar to that shown in FIG. 2. The LEDs 44 and 46 perform two different functions such as any combination of tail light, stop light, and turn signal. The LEDs may be the same color or different colors.

Figure 4:
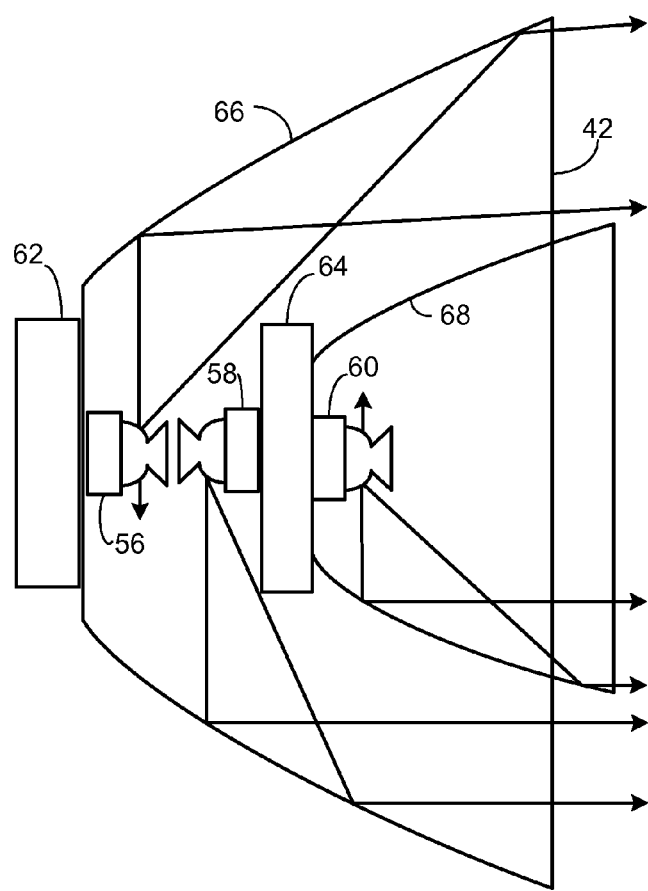
FIG. 4 is a cross-section of a fourth embodiment of a rear lamp assembly using three LEDs, where two LED are mounted facing each other in relatively large reflector, and a third LED is mounted in a smaller reflector within the larger reflector.

FIG. 4 illustrates a fourth embodiment of a rear lamp assembly incorporating three independently controllable LEDs 56, 58, and 60. LEDs 56 and 58 are mounted facing each other as in FIG. 1. LED 56 is mounted on heat sink 62, while LED 58 is mounted on heat sink 64. Heat sink 64 may be held in position by two or more metal or plastic legs, or a transparent cylinder, attached to the base of reflector 66.

LED 60 is also mounted on heat sink 64 and it located within a smaller reflector 68, so that the light emitted by reflector 66 forms a circle around the light emitted by reflector 68. The light patterns emitted by reflector 66 for LEDs 56 and 58 are generally the same.

LEDs 56 and 58 can emit the same color or different colors. In one embodiment, LED 56 is an amber turn signal, LED 58 is a red tail light, and LED 60 is a red stop light and also a red tail light. To signal a stop, an added current may be applied to LED 60. By providing two tail light LEDs 60 and 58, the overall light from the two reflectors is brighter and the tail light is emitted over the two reflector areas. This helps to further distinguish the red tail light from the red stop light.

FIG. 5 illustrates a fifth embodiment of a rear lamp assembly for a motor vehicle. LED 72 is a red tail light, LEDs 74 and 75 are amber turn signals, and LED 76 functions as both a red tail light and a stop light. To signal a stop, an added current may be applied to LED 76.

LEDs 72, 74, and 75 are mounted at the base of a relatively large reflector 82, and LED 76 is mounted at the base of a smaller reflector 84 affixed to the reflector 82 along the center axis of both reflectors. All LEDs include a side-emitting lens. The LEDs are thermally coupled to respective heat sinks 78 and 80. The LEDs 72, 74, and 75 may be mounted on the same PCB. The LEDs 72, 74, and 75 may be mounted in a triangular pattern or linearly. The LEDs are mounted as close to the center line as practical so that light from each LED is reflected in a similar manner by the reflector. Such proximateness of the LEDs to the center line causes the LEDs in one reflector to be substantially coaxially aligned with the one or more LEDs in the other reflector.

The LEDs 72, 74, and 75, mounted on the heat sink 78, may be fixed in place within reflector 82 by snapping the heat sink or PCB to the base of reflector 82 using two or more plastic flanges 86. The flanges 86 are around an opening in the base of reflector 82. The same or a different technique may be used to mount LED 76 and heat sink 80 within reflector 84. The heat sinks may take any form.

The smaller reflector 84 may be secured in place by a plastic support 88 connected to reflector 82. The plastic support 88 may be a transparent cylinder (or tiered cylinders) or may consist of pillars. A hollow plastic tube 90 may be used as a conduit for wires 92 leading to LED 76.

The inner reflector may be a cup with specular walls or may be a solid transparent polymer where reflection off the walls is due to total internal reflection (TIR).

In order to ensure that no light spot, emitted along the center line of LED 76, is visible at the center of reflector 84, a small circular reflector 93 is positioned over LED 76 and held in place by a transparent cylinder 94. The small reflector 93 redirects light downward so as to ultimately reflect off reflector 84.

The rear lamp assemblies described above may be housed in a plastic housing with a clear front lens, where the plastic housing has flanges for securing the housing to the frame of the vehicle using screws or other fasteners.

Various combinations of the designs are possible. Additional LEDs may also be included in either one of the reflectors for additional brightness or additional functions, such as a backup light when the automobile is shifted into reverse. One or more white LEDs, using one or more phosphorous layers over a blue LED, are suitable for the backup light. The backup light may also be one of the LEDs shown in the figures.

The reflectors shown in the figures may be any shape, such as circular, oblong, or rectangular.

FIG. 6 is a side view of an LED 95 with a combination of lenses, such as an inner lens 16 and an outer lens 96, where the outer lens further shapes the light emission. The shaped emission may be a narrower side emission.

The rear lamp assemblies described may be extremely compact and inexpensive since multiple functions are performed within the opening of a single reflector. Since LEDs produce less heat than incandescent light bulbs, heat dissipation is simpler. Further, since the side-emitting lenses 16 cause light to only be emitted around the sides of the LEDs, one or more other LEDs may be mounted coaxially without blocking any light from another LED. A diffuser lens at the output of the reflector(s) can easily cause the emitted light profile to be more uniform than the prior art light profiles, resulting in interesting and attractive lighting.

Having described the invention in detail, those skilled in the art will appreciate that given the present disclosure, modifications may be made to the invention without departing from the spirit and inventive concepts described herein. For example, LED colors in addition to red, green, and blue may be used in the backlight in accordance with the present invention. Therefore, it is not intended that the scope of the invention be limited to the specific embodiments illustrated and described.

What is claimed is:

1. A rear lamp assembly for an automobile comprising:
    a first light emitting diode (LED) with a first side-emitting lens;
    a second LED with a second side-emitting lens; and
    a first reflector at least partially surrounding the first LED and the second LED,
    wherein the first LED and the second LED are substantially coaxially aligned in the reflector, such that non-reflected direct light emitted by the first LED and the second LED overlap and impinge on a same area of the reflector that surrounds the first LED and the second LED, and wherein the first LED and the second LED are separately controlled for operation in a rear lamp assembly for a motor vehicle.

2. The assembly of claim 1 wherein the first LED emits light of a first color, and the second LED emits light of a second color different from the first color.

3. The assembly of claim 1 wherein the first side emitting lens and the second side emitting lens have top surfaces that face each other when the first LED and the second LED are coaxially aligned in the reflector.

4. The assembly of claim 1 wherein the first LED is mounted on a heat sink connected to a base of the reflector.

5. The assembly of claim 1 wherein the reflector is substantially parabolic, and the first LED and the second LED are positioned substantially at a focal point of the reflector.

6. The assembly of claim 1 further comprising current controllers connected to the first LED and the second LED.

7. The assembly of claim 1 wherein the first LED is a tail light of a motor vehicle, and the second LED is other than a tail light.

8. The assembly of claim 7 wherein the second LED is a stop light.

9. The assembly of claim 7 wherein the second LED is a turn signal.

10. The assembly of claim 1 wherein the first LED and the LED are substantially coaxially mounted in a same direction such that the first side emitting lens and the second side emitting lens do not face each other.

11. The assembly of claim 1 wherein the first reflector is substantially circular.

12. The assembly of claim 1 wherein the first reflector is substantially rectangular.

13. The assembly of claim 1 further comprising a diffusing lens over an opening in the first reflector.

14. A rear lamp assembly for an automobile comprising:
    a first light emitting diode (LED) with a first side-emitting lens;
    a second LED with a second side-emitting lens;
    a first reflector at least partially surrounding the first LED and the second LED,
    wherein the first LED and the second LED are substantially coaxially aligned in the reflector, and wherein the first LED and the second LED are separately controlled for operation in a rear lamp assembly for a motor vehicle; and
    a third LED having a third side emitting lens, the third LED being partially surrounded by the first reflector and substantially coaxially aligned with the first LED and the second LED, the third LED being controlled separately from the first LED and the second LED.

15. The assembly of claim 14 wherein the third LED and the first LED are mounted in a same direction, and the third LED and second LED are mounted in opposite directions, wherein a top of the first side emitting lens faces a top of the second side emitting lens.

16. The assembly of claim 14 further comprising a second reflector at least partially surrounded by the first reflector, the third LED being mounted in the second reflector, such that light emitted by the first reflector substantially surrounds light emitted by the second reflector.

17. The assembly of claim 14 wherein the third LED and the first LED are mounted in a same direction, and the third LED and second LED are mounted in opposite directions, wherein a top of the first side emitting lens faces a top of the second side emitting lens, the assembly further comprising a heat sink between the third LED and the second LED for sinking heat from both the third LED and the second LED.

18. The assembly of claim 14 wherein the third LED emits light of a color that is different from a color of light emitted by the first LED and the second LED.

19. A rear lamp assembly for an automobile comprising:
a first light emitting diode (LED) with a first side-emitting lens;
a first reflector at least partially surrounding the first LED;
a second LED with a second side-emitting lens; and
a second reflector at least partially surrounded by the first reflector, the second LED being mounted in the second reflector, the first reflector and the second reflector being arranged such that that light from the first LED and second LED is not mixed within either of the first reflector or second reflector, and such that all light generated by the first LED is blocked from entering an area surrounded by the second reflector, and such that light generated by the first LED and emitted by the first reflector substantially surrounds light emitted by the second reflector,
wherein the first LED and the second LED are separately controllable for operation in a rear lamp assembly for a motor vehicle to convey different information.

20. The assembly of claim 19 wherein the first LED and the second LED are substantially coaxially mounted in a same direction such that the first side emitting lens and the second side emitting lens do not face each other, the assembly further comprising a heat sink between the first LED and the second LED.

21. The assembly of claim 19 wherein a center line of the second reflector is substantially aligned with a center line of the first reflector.

22. The assembly of claim 19 further comprising a third LED with a side-emitting lens, the third LED mounted such that the first reflector at least partially surrounds the third LED and such that light generated by the third LED and emitted by the first reflector substantially surrounds light emitted by the second reflector.

23. The assembly of claim 22 further comprising a fourth LED with a side-emitting lens, the fourth LED mounted such that the first reflector at least partially surrounds the fourth LED and such that light generated by the fourth LED and emitted by the first reflector substantially surrounds light emitted by the second reflector.

24. The assembly of claim 23 wherein the first LED emits red light for a tail light, the second LED emits red light for a stop light, and the third LED emits amber light for a turn signal.

25. The assembly of claim 24 wherein the fourth LED emits amber light for a turn signal.

* * * * *